(12) United States Patent
Kobayashi

(10) Patent No.: US 7,561,562 B2
(45) Date of Patent: Jul. 14, 2009

(54) COMMUNICATION TERMINAL

(75) Inventor: Fumiaki Kobayashi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 808 days.

(21) Appl. No.: 10/650,915

(22) Filed: Aug. 29, 2003

(65) Prior Publication Data

US 2005/0078697 A1    Apr. 14, 2005

(30) Foreign Application Priority Data

Aug. 30, 2002    (JP)    ............................. 2002-255790

(51) Int. Cl.
*H04L 12/28* (2006.01)
*G06F 16/16* (2006.01)

(52) U.S. Cl. ........................ 370/351; 709/206
(58) Field of Classification Search ................. 370/428, 370/351
See application file for complete search history.

(56) References Cited

U.S. PATENT DOCUMENTS

| | | | |
|---|---|---|---|
| 5,946,630 A * | 8/1999 | Willars et al. ................ 455/466 |
| 6,195,686 B1 * | 2/2001 | Moon et al. .................. 709/206 |
| 6,587,693 B1 * | 7/2003 | Lumme et al. ............... 455/466 |
| 6,690,777 B2 * | 2/2004 | Pecht ..................... 379/100.01 |
| 6,885,872 B2 * | 4/2005 | McCann et al. ............. 455/466 |
| 7,054,661 B1 * | 5/2006 | Kohli et al. ................. 455/560 |
| 7,069,030 B2 * | 6/2006 | Yoon ........................... 455/466 |
| 7,181,231 B2 * | 2/2007 | Le Bodic et al. ............ 455/466 |
| 7,209,950 B2 * | 4/2007 | Bennett et al. .............. 709/206 |
| 7,215,970 B2 * | 5/2007 | Corrigan et al. ............ 455/466 |
| 7,218,921 B2 * | 5/2007 | Mendiola et al. .......... 455/414.1 |
| 2002/0026520 A1 * | 2/2002 | Mendiola et al. ............. 709/230 |
| 2002/0077134 A1 | 6/2002 | Mizell et al. |
| 2002/0112014 A1 * | 8/2002 | Bennett et al. .............. 709/206 |
| 2004/0049551 A1 * | 3/2004 | Kobayashi et al. ......... 709/208 |
| 2005/0233759 A1 * | 10/2005 | Anvekar et al. ............ 455/466 |

FOREIGN PATENT DOCUMENTS

| | | | |
|---|---|---|---|
| DE | 198 57 902 A1 | 6/2000 |
| DE | 101 14 950 A1 | 1/2002 |

* cited by examiner

*Primary Examiner*—Wing F Chan
*Assistant Examiner*—Eunsook Choi
(74) *Attorney, Agent, or Firm*—Birch, Stewart, Kolasch & Birch, LLP

(57) ABSTRACT

An object of the invention is to provide a communication terminal having improved convenience when a user utilizes a short message service. An SMS related table memory portion of a memory device has a storing region for each SMSC apparatus, and the telephone number, the program of the communication protocol and the parameter of the SMSC apparatus are stored in each storing region. When sending a short message, if the SMSC apparatus to which the user desires to send a short message is selected with an input device, a controlling device refers to the storing region for the selected SMSC apparatus of the SMS related table memory portion, and performs dial calling from a network control device based on the telephone number and the communication protocol of the SMSC apparatus that are stored. Then a line is established, short message data prepared in advance is sent to the SMSC apparatus.

11 Claims, 6 Drawing Sheets

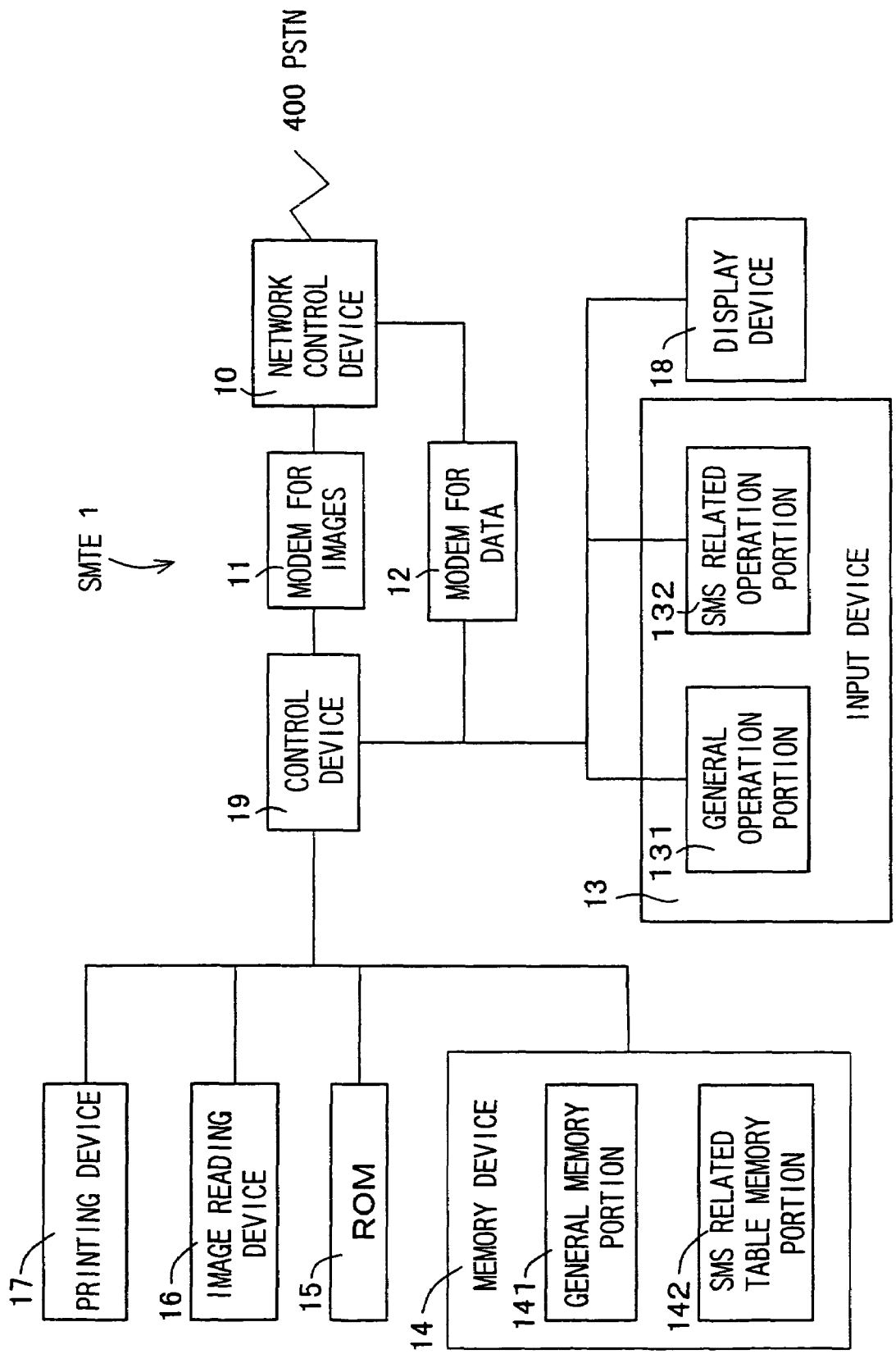

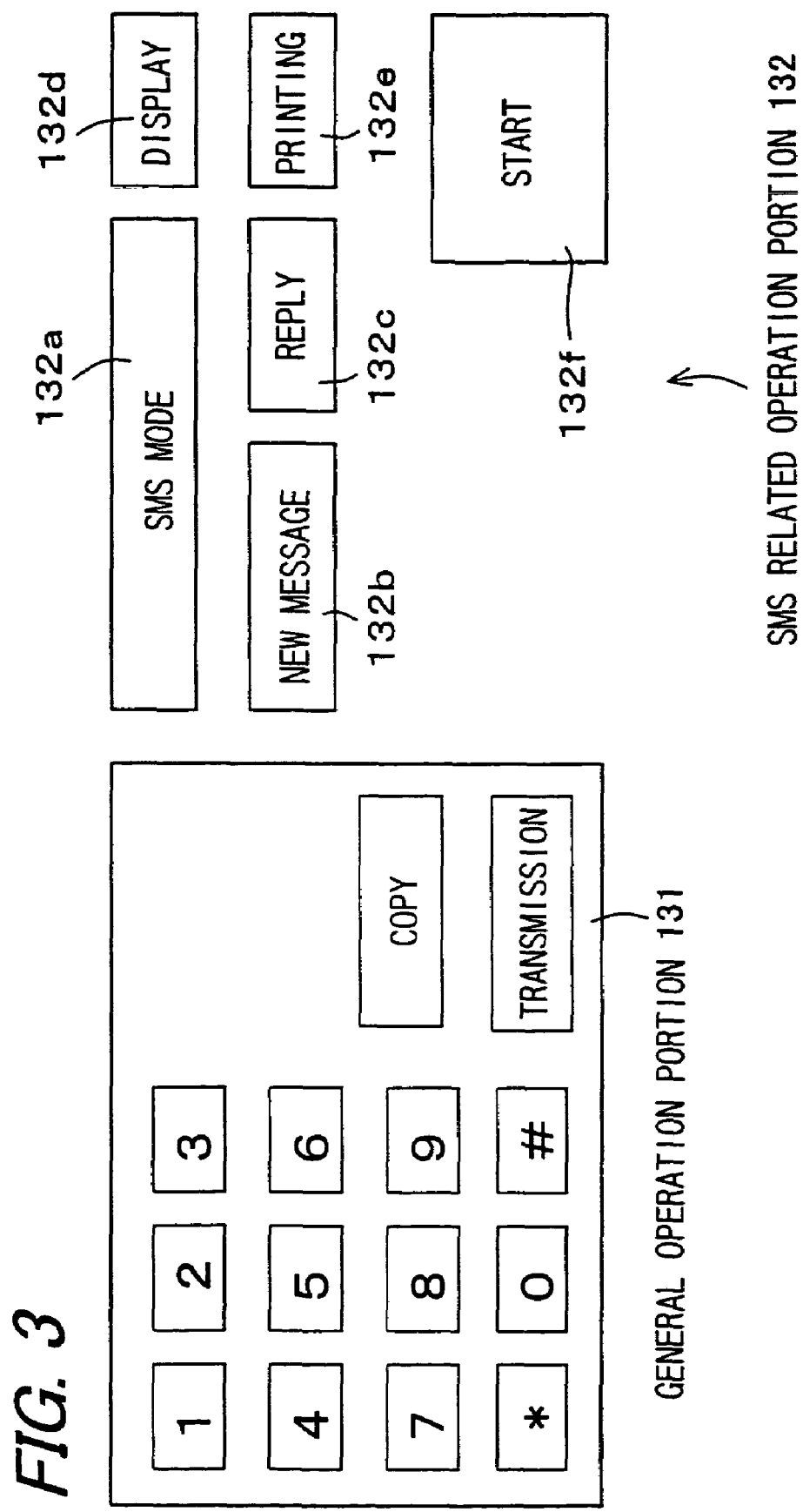

FIG. 4

| SMSC APPARATUS 100 | | |
|---|---|---|
| SENDER ID (TELEPHONE NUMBER): 987 654 321 | PRIORITY SENDING FLAG: 0 | PRIORITY RECEIVING FLAG: 1 |
| APPLICATION PROGRAM (PROTOCOL · PARAMETER) | | |
| RECEIVED DATA : (BLOCK 1) | | |
| RECEIVED DATA : (BLOCK 2) | | |
| RECEIVED DATA : (BLOCK 3) | | |
| | | |
| RECEIVED DATA : (BLOCK 10) | | |

| SMSC APPARATUS 200 | | |
|---|---|---|
| SENDER ID (TELEPHONE NUMBER): 876 543 210 | PRIORITY SENDING FLAG: 0 | PRIORITY RECEIVING FLAG: 0 |
| APPLICATION PROGRAM (PROTOCOL · PARAMETER) | | |
| RECEIVED DATA : (BLOCK 1) | | |
| RECEIVED DATA : (BLOCK 2) | | |
| RECEIVED DATA : (BLOCK 3) | | |
| | | |
| RECEIVED DATA : (BLOCK 10) | | |

| SMSC APPARATUS 300 | | |
|---|---|---|
| SENDER ID (TELEPHONE NUMBER): 765 432 109 | PRIORITY SENDING FLAG: 1 | PRIORITY RECEIVING FLAG: 0 |
| APPLICATION PROGRAM (PROTOCOL · PARAMETER) | | |
| RECEIVED DATA : (BLOCK 1) | | |
| RECEIVED DATA : (BLOCK 2) | | |
| RECEIVED DATA : (BLOCK 3) | | |
| | | |
| RECEIVED DATA : (BLOCK 10) | | |

| COMMON TO SMSC APPARATUS | | |
|---|---|---|
| *************************** | ************** | ***************** |
| *************************** | | |
| COMMON RECEIVED DATA: (BLOCK 1) | | |
| COMMON RECEIVED DATA: (BLOCK 2) | | |
| COMMON RECEIVED DATA: (BLOCK 3) | | |
| | | |
| COMMON RECEIVED DATA: (BLOCK 10) | | |

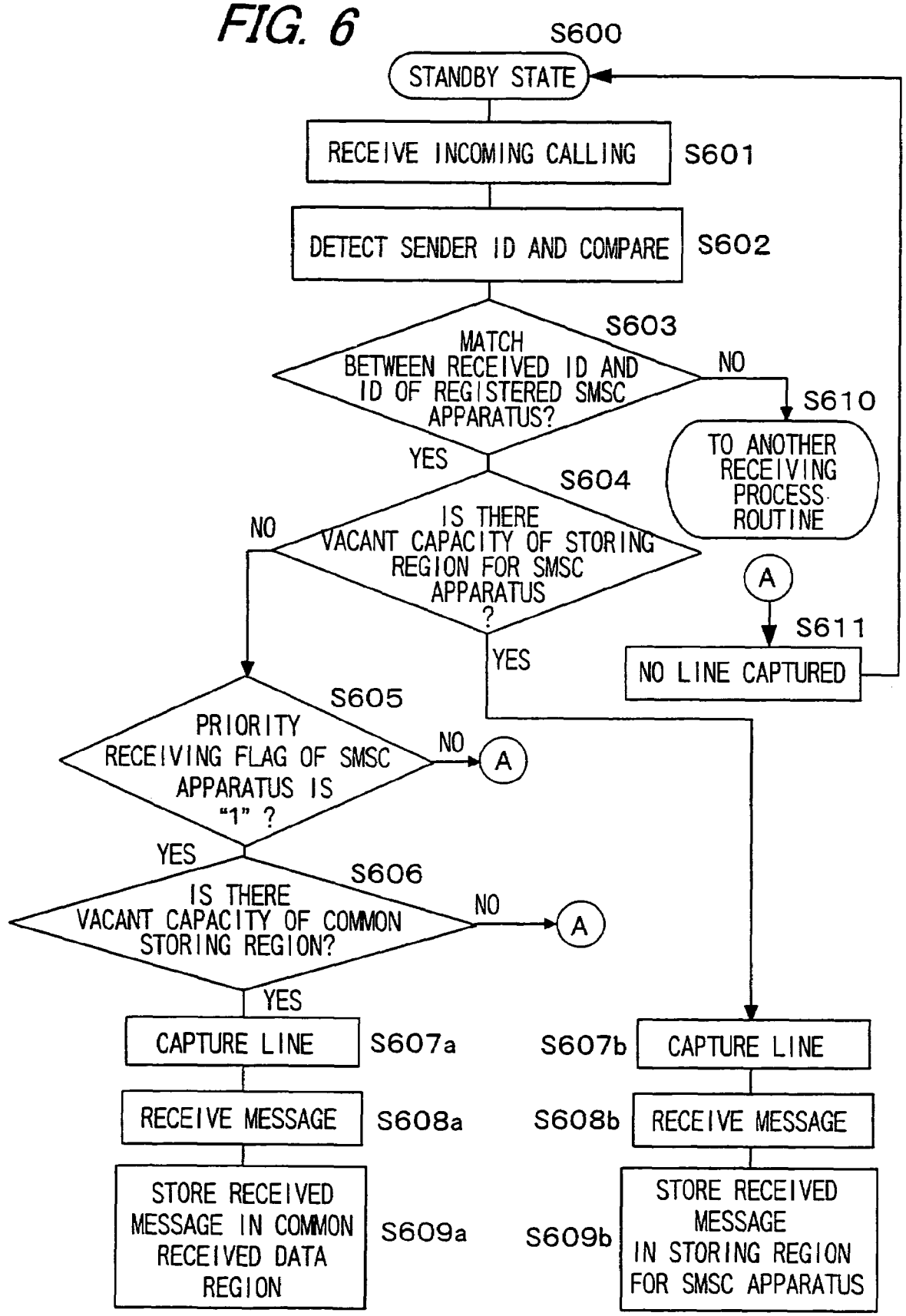

COMMUNICATION TERMINAL

This nonprovisional application claims priority under 35 U.S.C. § 119(a) on Patent Application No. 2002-255790 filed in Japan on Aug. 30, 2002, which is herein incorporated by reference.

BACKGROUND OF THE INVENTION

1. Field of the Invention

The present invention relates to a communication terminal connected to a public line network, for sending and receiving short message data to/from another communication terminal via a center apparatus connected to the public line network.

2. Description of the Related Art

In recent years, a short message service system is constructed in which a short message service center (hereinafter, abbreviated as "SMSC") apparatus connected to a public line network via a gateway or the like transmits short messages between communication terminals connected to the public line network by "store-and-forward", which is a form of storage and forwarding of messages, utilizing wired or wireless communications, and a large number of communication terminal users utilize this system. The "short message" refers to character data constituted by not more than a predetermined number of characters such as about several tens of characters.

The short messages can be sent and received by the following two steps: the first step of storing (accumulating) short messages and the second step of forwarding (transferring) the short messages.

In the storing step, a short message is sent from a sending communication terminal to an SMSC apparatus, and the SMSC apparatus stores the received short message. In the forwarding step, the SMSC apparatus sends the received short message to a receiving-communication terminal.

In the storing step, the sending communication terminal dials the telephone number of the SMSC apparatus on a public line network in order to establish connection to the SMSC apparatus to send a short message to the SMSC apparatus. The switchboard of the public line network sends the ID (i.e., the telephone number) of the sender of the sending communication terminal in accordance with the incoming call signal (ringer). The SMSC apparatus uses the sender ID to identify the sending communication terminal and also uses the sender ID to charge the service fees after the identification. When a link of the communication line is established between the sending communication terminal and the SMSC apparatus, a phase of a short message transfer between the sending communication terminal and the SMSC apparatus is started. When the transfer of the short message from the sending communication terminal ends, the line is opened. The SMSC apparatus stores the short message received from the sending communication terminal in storing means.

In the forwarding step, the SMSC apparatus dials the telephone number of a receiving communication terminal on the public line network in order to establish connection to the receiving communication terminal to send the stored short message to the SMS compatible receiving communication terminal. The ID (telephone number) of the receiving communication terminal is contained in the short message in advance. The switchboard of the public line network sends the sender ID of the SMSC apparatus to the receiving communication terminal in accordance with the incoming call signal. The receiving communication terminal uses the sender ID of the SMSC apparatus to identify the sending apparatus. When the result of the identification confirmed that the incoming call is from the SMSC apparatus, the receiving communication terminal is switched automatically to the mode of receiving a short message and establishes a communication line with the SMSC apparatus, and when the line is established, the short message is transferred from the SMSC apparatus. When the transfer ends, the line is opened.

The short message transmission service (SMS) is performed by the above-described steps, and a large number of communication terminal users contract with an SMS provider for subscription and thus gain benefits.

Conventionally, a communication terminal user generally contracts with only one short message service provider, and therefore the short message service-compatible communication terminal receives and sends short messages only via the SMSC apparatus of the provider with whom the user contracted. Therefore, the user cannot use an SMSC apparatus other than that of the provider with whom the user contracted. Consequently, short messages cannot be sent and received to/from a user that uses a short message transmission service provided by the other providers. Furthermore, the billing terms of charges or the service available time zone depend on the provider, but the user cannot use other SMSC apparatuses than that of the provider with whom the user contracted. Therefore, there is no degree of freedom in the use conditions, and the convenience and the cost are problematic.

SUMMARY OF THE INVENTION

It is an object of the invention to provide a communication terminal having improved convenience when a user uses a short message service.

The invention provides a communication terminal that is connected to a public line network, for communicating with a center apparatus connected to the public line network to send and receive short message data to/from another communication terminal via the center apparatus, comprising:

input means for inputting short message data, communicating means that is connected to the public line network, for communicating the center apparatus, storing means for storing a plurality types of communication protocol information for each center apparatus to be used for communications of the communicating means, selecting means for selecting a center apparatus to be communicated with among the center apparatuses whose communication protocol information is stored, based on a predetermined condition, and controlling means for controlling the communicating means so as to send short message data to the center apparatus when sending the inputted short message data, and to receive short message data from the center apparatus when receiving the short message data, based on the communication protocol information of the center apparatus selected by the selecting means.

According to the invention, the storing means stores a plurality of types of communication protocol information for each center apparatus to be used for communications of the communicating means, and the selecting means selects a center apparatus to be communicated with among the center apparatuses whose communication protocol information is stored, based on a predetermined condition. When a center apparatus is selected by the selecting means, the communicating means is controlled by the controlling means based on the communication protocol information of the selected center apparatus, and is connected to the public line network so as to communicate with the center apparatus.

Thus, when sending the short message data inputted with the input means, the short message can be sent with the communication protocol suitable for the center apparatus to which the message is to be sent. When receiving short message data, the short message data can be received with the communication protocol suitable for the center apparatus from which the message is sent.

Therefore, short message data can be sent and received to/from other communication terminals via a plurality of center apparatuses. Each center apparatus is provided by a different short message service provider, so that by using a plurality of center apparatuses, for example, the user can utilize a short message service in accordance with the communication terminal to which short message data is to be sent out, the time zone for use, the billing terms and the like, which improves the convenience.

Furthermore, in the invention it is preferable that the storing means includes an individual storing region assigned to each of the plurality of center apparatuses and a common storing region assigned commonly to the plurality of center apparatuses, in the individual storing region, at least
identification information to identify the center apparatus,
communication protocol information to be used for communications with the center apparatus, and
short message data received from the center apparatus are stored,
the controlling means refers to the individual storing region assigned to the center apparatus selected by the selecting means, and controls the communicating means based on the identification information and the communication protocol information that are stored.

According to the invention, the storing means includes an individual storing region assigned to each of the plurality of center apparatuses and a common storing region assigned commonly to the plurality of center apparatuses. For example, when the user performs input, at least identification information to identify the center apparatus, communication protocol information to be used for communications with the center apparatus, and short message data received from the center apparatus are stored in the individual storing region. The controlling means refers to the individual storing region assigned to the center apparatus selected by the selecting means, and controls the communicating means based on the identification information and the communication protocol information that are stored.

Thus, it is not necessary to input the telephone number, which is information to identify the center apparatus, or the communication protocol information such as communication parameters when starting communications, and short message data can be sent and received to/from other communication terminals via a plurality of center apparatuses easily.

Furthermore, in the invention it is preferable that the communication terminal further comprises instructing means for instructing a center apparatus to be communicated with, and the selecting means selects the center apparatus based on instruction of the instructing means.

According to the invention, when a user instructs a center apparatus to be communicated with by the instructing means, the selecting means selects the center apparatus based on instruction of the instructing means.

Thus, the user can instruct a center apparatus to be communicated with, and selects a short message service that is desired to use.

Furthermore, in the invention it is preferable that the communicating means detects identification information contained in a received incoming calling, the selecting means compares the identification information detected by the communicating means with the identification information of the center apparatus stored in each individual storing region so as to select a center apparatus corresponding to the matched identification information, and the controlling means refers to the individual storing region assigned to the selected center apparatus and controls the communicating means so as to receive short message data based on the stored communication protocol information.

According to the invention, when the communicating means detects identification information contained a received incoming calling, the selecting means compares the detected identification information with the identification information of the center apparatus stored in each individual storing region. Thus, the selecting means selects the center apparatus corresponding to the telephone number that is matched in this comparison. The controlling means refers to the individual storing region assigned to the selected center apparatus and controls the communicating means so as to receive short message data based on the stored communication protocol information.

Thus, short message data sent from any one of the plurality of center apparatuses can be received easily.

Furthermore, in the invention it is preferable that a priority receiving flag indicating whether or not the center apparatus is a center apparatus whose short message data should be received by priority is stored in each individual storing region, the controlling means determines whether or not a vacant capacity of the individual storing region assigned to the center apparatus from which short message data is sent is smaller than a predetermined capacity when receiving the short message data; when the vacant capacity is the predetermined capacity or more, the short message data is stored in the individual storing region; and when the vacant capacity is smaller than the predetermined capacity, the priority receiving flag is referred to; and if the center apparatus from which the short message data is sent is a center apparatus whose short message data should be received by priority, the received short message data is stored in the common storing region.

According to the invention, the controlling means determines whether or not a vacant capacity of the individual storing region assigned to the center apparatus that has sent an short message data is smaller than a predetermined capacity when receiving the short message data. When the vacant capacity is the predetermined capacity or more, the short message data is stored in the individual storing region. When the vacant capacity is smaller than the predetermined capacity, the priority receiving flag stored in the individual storing region is referred to; and if the center apparatus from which the short message data is sent is a center apparatus whose short message data should be received by priority, the received short message data is stored in the common storing region.

Thus, when the vacant capacity of the individual storing region is insufficient when receiving short message data, at least the short message data sent from the center apparatus whose short message data is set to be received by priority, for example, the short message data sent from the center apparatus of a short message service provider that is used by a user for business communications can be stored.

Furthermore, in the invention it is preferable that the communication terminal further comprises designating means for designating specific short message data among the received short message data that is stored in the storing means, the selecting means selects a center apparatus from which the short message data designated by the designating means are sent, and the controlling means refers to the individual storing region assigned to the selected center apparatus, and controls the communicating means so as to send the short message data inputted with the input means based on the stored communication protocol information.

According to the invention, when a user designates specific short message data among the received short message data that is stored in the storing means, using the designating means, the selecting means selects a center apparatus from which the short message data designated by the designating means are sent. The controlling means refers to the individual storing region assigned to the selected center apparatus, and controls the communicating means so as to send the short message data inputted with the input means based on the stored communication protocol information.

Thus, when sending a reply to the received short message data, the user only has to designate the short message data to which the user desires to send a reply, and therefore it is not necessary to designate the center apparatus, and thus a reply can be sent easily.

Furthermore, in the invention it is preferable that when an incoming calling signal is received from a center apparatus by the communicating means in the course of performing a process other than the process of sending and receiving short message data, the controlling means interrupts the ongoing process, and controls the communicating means so as to receive short message data, and the controlling means resumes the interrupted process when the short message data is completed to be received.

According to the invention, when an incoming calling signal is received from the center apparatus by the communicating means in the course of performing a process other than the process of sending and receiving short message data, then the controlling means interrupts the ongoing process and controls the communicating means so as to receive short message data, and the controlling means resumes the interrupted process when the short message data is completed to be received.

Thus, even if the communication terminal is performing another process, short message data can be received, and it is not necessary to call back the center apparatus.

Furthermore, in the invention it is preferable that the communication terminal further comprises at least one of displaying means for displaying received short message data, and printing means for printing received short message data.

According to the invention, the received short message data is at least displayed by the displaying means or printed by the printing means with the character font converted from the character code.

Thus, the user can confirm the received short message data by watching the display device. Furthermore, the user can print the received short message data for confirmation or preservation.

BRIEF DESCRIPTION OF THE DRAWINGS

Other and further objects, features, and advantages of the invention will be more explicit from the following detailed description taken with reference to the drawings wherein:

FIG. 2 is a block diagram showing the configuration of a short message service compatible communication terminal (SMTE), which is an embodiment of the invention;

FIG. 3 is a diagram showing an example of a key structure of an input device;

FIG. 4 is a diagram showing the storing region of an SMS related table memory portion;

FIG. 6 is a flow chart showing the short message data receiving process of the SMTE.

DETAILED DESCRIPTION OF THE PREFERRED EMBODIMENTS

Figure 1:
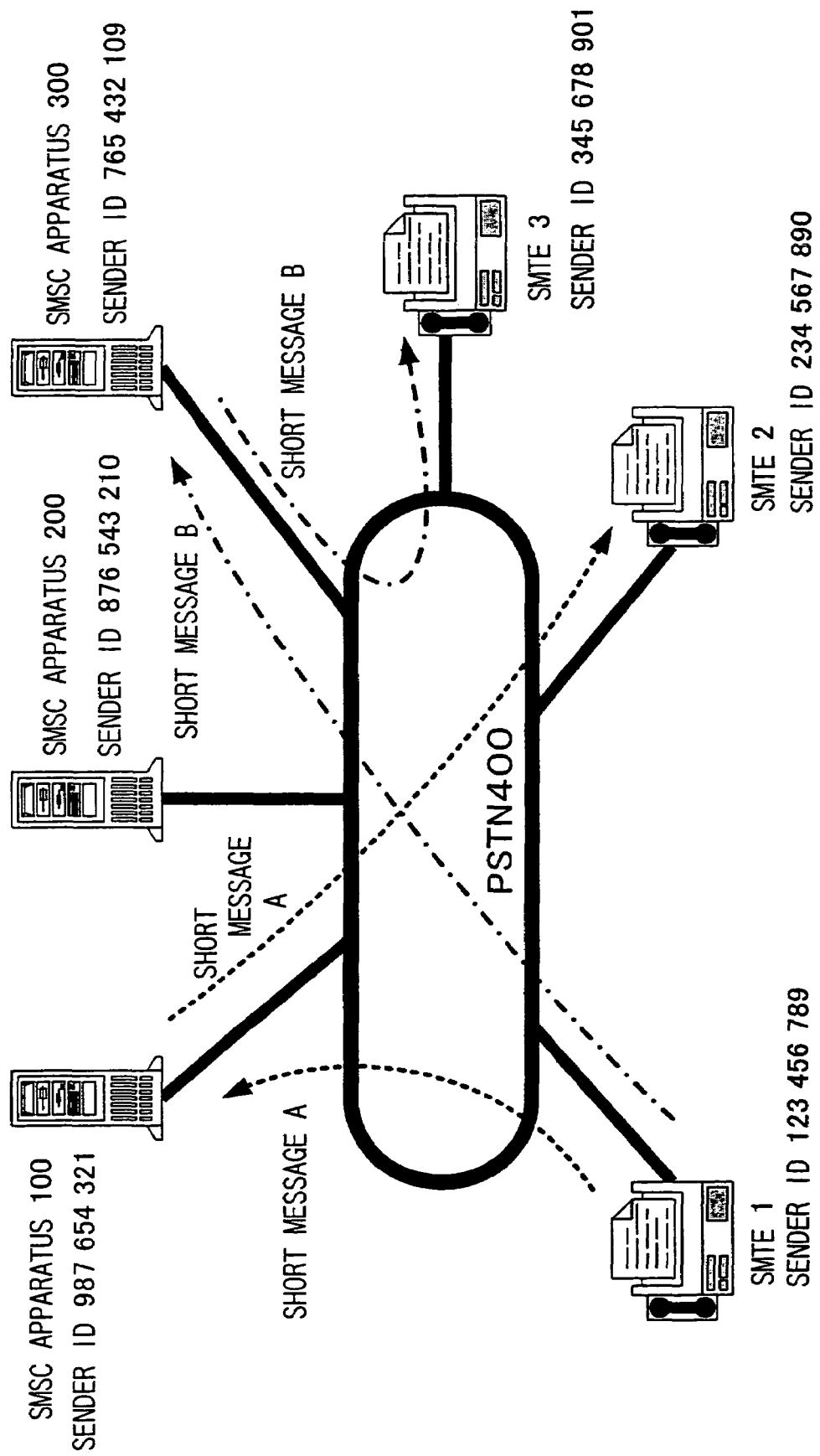
FIG. 1 is a schematic view of a transmission system of a short message service.

Now referring to the drawings, preferred embodiments of the invention are described below.

The invention is not limited thereby.

FIG. 1 is a schematic view of a transmission system of a short message service. Short message service compatible communication terminals (hereinafter, abbreviated as "SMTE") 1, 2, 3 and SMSC apparatuses 100, 200, and 300 are connected to a PSTN (public switchboard telephone network) 400, which constitute a transmission system of a short message service. The invention can apply to various communication terminals connected to the PSTN 400, but herein, a facsimile apparatus is taken as the communication terminal. The manner in which the SMTEs that are embodiments of the invention operate for short message transmission will be described with reference to FIG. 1.

The PSTN 400 is a public line network made of wired media, and the SMSC apparatuses 100, 200, and 300 are connected to the PSTN 400 and constitute a part of the group of SMSC apparatuses that perform a short message transmission service. The SMSC apparatuses 100, 200, and 300 have "987 654 321", "876 543 210", and "765 432 109" as the sender ID (telephone number) on the PSTN, respectively. The SMSC apparatuses 100, 200, and 300 are SMSC apparatuses that perform a short message service provided by different providers from each other.

The SMTEs 1, 2, and 3 constitute a part of the group of SMTEs that connected to the PSTN 400 in order to receive a short message service. The SMTEs 1, 2, and 3 have "123 456 789", "234 567 890", and "345 678 901" as the sender ID (telephone number) on the PSTN, respectively. The SMTE 1, 2, and 3 are used by different users. The SMTEs 1 and 3 are communication terminals that are embodiments of the invention and the SMTE 2 is a conventional communication terminal. The case where a short message is sent from the SMTE 1 to each of the SMTEs 2 and 3 will be described.

The arrow of a broken line in FIG. 1 shows a communication path of a short message A when the short message A is sent from the SMTE 1 to the SMTE 2. The SMTE 1 is configured such that the SMTE 1 can send a short message to any of the SMSC apparatuses 100, 200 and 300, and that the user can select the SMSC apparatus to which a short message is to be sent. Since the SMTE 2 is a conventional communication terminal, the SMTE 2 can communicate only with the SMSC apparatus 100. Therefore, the user of the SMTE 1 selects the SMSC apparatus 100 as a sending destination, and the short message A addressed to the SMTE 2 is sent from the SMTE 1. The SMSC apparatus 100 temporarily stores the short message A received from the SMTE 1. Then, the SMSC apparatus 100 calls the SMTE 2 to which the short message is to be sent, and after establishing a line, the short message A is sent out. Thus, the short message A can be sent from the SMTE 1 to the SMTE 2.

The arrow of a chain line in FIG. 1 shows a communication path of a short message B when the short message B is sent from the SMTE 1 to the SMTE 3. The SMTE 3 can receive a short message from any of the SMSC apparatuses 100, 200 and 300. Therefore, the user of the SMTE 1 sends the short message B addressed to the SMTE 3 from the SMTE 1 without making a selection of the SMSC apparatus. In this manner, when the user does not make a selection of the SMSC apparatus, the SMTE 1 sends the short message B to the predetermined SMSC apparatus, for example, the SMSC apparatus 300. The SMSC apparatus 300 temporarily stores the short message B received from the SMTE 1. Then, the SMSC apparatus 300 calls the SMTE 3 to which the short message is to be sent, and after establishing a line, the short message B is sent out. Thus, the short message B can be sent from the SMTE 1 to the SMTE 3.

Next, the communication terminals that can transmit short messages in the above-described manner will be described in detail.

FIG. 2 is a block diagram showing the configuration of the short message service compatible communication terminal (SMTE) 1, which is an embodiment of the invention. The SMTE 1 is a facsimile apparatus and includes a network control device 10, a modem for images 11, a modem for data 12, an input device 13, a memory device 14, a ROM (read-only memory) 15, an image reading device 16, a printing device 17, a display device 18 and a control device 19. The network control device 10 is connected to the PSTN 400, has the electrical characteristics required by the PSTN 400, monitors the status of the line, receives signals from the PSTN and sends signals to the PSTN 400. The modem for images 11 modulates digital signals for images to be sent into analog signals suitable for the PSTN 400, and demodulates the analog signal (facsimile signals) for images received by the network control device 10. The modem for data 12 demodulates data signals received by the network control device 10 in order to identify the short message and the sender ID (CID) and modulates character data to be sent. The network control device 10 and the modem for data 12 constitute communicating means. The image reading device 16 is a device for reading an original text to be sent by a facsimile or copied, and employs a reading method such as a reading method with an optical system that has been reduced in size by combining a lens and a CCD line sensor or a method with a contact sensor using a rod lens array. The printing device 17 is printing means for printing image data received by the network control device 10, short message data (character data) and the image data that is read out by the image reading device 16, and uses a printing system such as a thermal system, an electrophotographic system, an inkjet system or the like.

The memory device 14 is storing means including a general memory portion 141 and an SMS related table memory portion 142. The general memory portion 141 is used as a working memory, a buffering or the like for storing received or read images or the status of the SMTE 1 related to transmission of facsimile data, or temporarily storing various data during operation. The SMS related table memory portion 142 stores the state of the SMTE 1 related to transmission of short messages or data specific to the short message service, for example, short message data that is received. The data to be stored in the SMS related table memory portion 142 will be described later.

The input device 13 includes a general operation portion 131 and an SMS related operation portion 132. The general operation portion 131 includes dial keys used to input a telephone number for facsimile transmission or telephone calling or is used for other operations. The SMS related operation portion 132 is used to select the SMSC apparatus to which a short message is to be sent and perform other operations related to transmission of short messages. Examples of the key structure of each operation portion will be described later.

The display device 18 is displaying means that can be realized by a liquid crystal display or the like, and displays the operation state of the SMTE 1 during facsimile transmission, telephone calling or short message transmission, or displays image data or short message data. The input device 13 and the display device 18 constitute input means, instructing means and designating means.

The control device 19 determines the operation of the entire SMTE 1 based on the inputted information from the input device 13, the information received from the PSTN 400 or the like in cooperation with the memory device 14 and the ROM 15 in which a control program for operating the SMTE 1 is stored, and supplies instructions to the entire SMTE 1. The control device 19 constitutes selecting means and controlling means.

FIG. 3 is a diagram showing an example of the key structure of the input device 13. The general operation portion 131 includes number keys, operation keys for facsimile, and operation keys for telephone. The SMS related operation portion 132 includes an SMS mode key 132*a*, a new message key 132*b*, a reply key 132*c*, a display key 132*d*, a printing key 132*e*, and a start key 132*f*.

The SMS mode key 132*a* is a key to be entered when switching the operation mode of the SMTE 1 from the facsimile mode to the SMS mode. When a user enters the SMS mode key 132*a*, the control device 19 operates the display device 18 so as to display that the key is entered, and performs preparation for an operation such as initialization of the modem for data 12.

When the new message key 132*b* is entered in the SMS mode, a new short message can be sent. After the new message key 132*b* is entered, the telephone number of the SMTE to which a message is to be sent, short message data, and the like are inputted.

When the reply key 132*c* is entered in the SMS mode, a short message that is prepared can be sent as a reply to the SMTE that sent a received short message. For example, the display key 132*d* is entered to display a received short message on the display device 18, and in this state, the reply key 132*c* is entered. Then, when a short message to be sent is inputted with the input device, the prepared short message can be sent as a reply to the SMTE that sent the displayed short message. When the printing key 132*e* is entered in the SMS mode, received short message data can be printed with the printing device 17. For example, the display key 132*d* is entered to display a received short message on the display device 18, and in this state, when the printing key 132*e* is entered, the displayed short message can be printed.

The start key 132*f* is entered to send, display and print short messages as described above, and thus the operation can be confirmed.

FIG. 4 is a diagram showing a storage region of the SMS related table memory portion 142. As shown in FIG. 4, the SMS related table memory portion 142 has a plurality of storage regions. These storages regions are constituted by storage regions 101, 201 and 301 for the SMSC apparatuses 100, 200 and 300, respectively, which are individual regions, and a storage region 401 common to the SMSC apparatuses, which is a common storage region. Even in the case where more SMSC apparatuses are registered, the allocation is performed in the same manner.

In the storage region 101 for the SMSC apparatus 100, the name of the SMSC apparatus, the sender ID (telephone number) of the SMSC apparatus, the priority sending flag, the priority receiving flag, the application program, and received data is stored. As the name of the SMSC apparatus, the name inputted by the user to identify the SMSC apparatus when registering an SMSC apparatus to which a short message is to be sent is stored. In FIG. 4, "SMSC apparatus 100" is stored. As the sender ID (telephone number), identification information to identify the SMSC apparatus of the sender, that is, the number unique to the SMSC apparatus, and in general, the telephone number assigned to the SMSC apparatus is stored. In FIG. 4, the telephone number "987 654 321" of the SMSC apparatus 100 is stored. The application program (protocol parameter) that is communication protocol information is a communication program and a communication parameter for communications with a communication protocol required for mutual communications with the SMSC apparatus. A part of or the entire application program can be acquired by downloading from the SMSC apparatus.

When the user selects the SMSC apparatus to which a message is to be sent by a key operation for sending a short message, the control device 19 refers to the storage region for the selected SMSC apparatus of the SMS related table memory portion 142 and dials the stored telephone number for calling. When a call is received, the control device 19 refers to the storage regions of all the SMSC apparatuses and determines whether or not the telephone number contained in the received signals matches any of the stored telephone numbers. When there is a match, the short message is received with the stored communication protocol and parameter.

The priority sending flag is a flag showing the SMSC apparatus that sends a short message by priority when a plurality of SMSC apparatuses are registered, and "1" is stored for the SMSC apparatus that is given priority, and "0" is stored for the other apparatuses. As described above, when the user does not select the SMSC apparatus to which a short message is to be sent, the SMSC apparatus that is assigned "1" as the priority sending flag is selected automatically, and a short message is sent out. The priority receiving flag is a flag indicating the SMSC apparatus whose short message data should be received by priority when a plurality of SMSC apparatuses are registered, and "1" is stored for the SMSC apparatus that is given priority, and "0" is stored for the other apparatuses.

When a short message is received, the received short message is stored in the storage region for the SMSC apparatus. However, the capacity of the received data storage region that is assigned to the storage region for each SMSC apparatus has a limit. Therefore, when the vacant capacity of the received data storage regions is insufficient, the short message data cannot be stored. In this case, when the control device 19 determines that the capacity of the received data storage region is insufficient, the priority receiving flag of the SMSC apparatus whose short message is to be received is referred to. Then, when the priority receiving flag is "1", the short message is received and is stored in the common received data storage region of the storage region 401 common to the SMSCs. When the priority receiving flag is "0", the line is not established and the short message is not received.

The received data is short message data received from the SMSC apparatus and is defined based on the maximum number of characters of a short message. In this embodiment, for example, it is 160 bytes and the data is stored in blocks segmented for every 160 bytes.

The name of the SMSC apparatus, the sender ID (telephone number), the priority sending flag, and the priority receiving flag are inputted by the user with the input device 13 and are stored.

Figure 5:
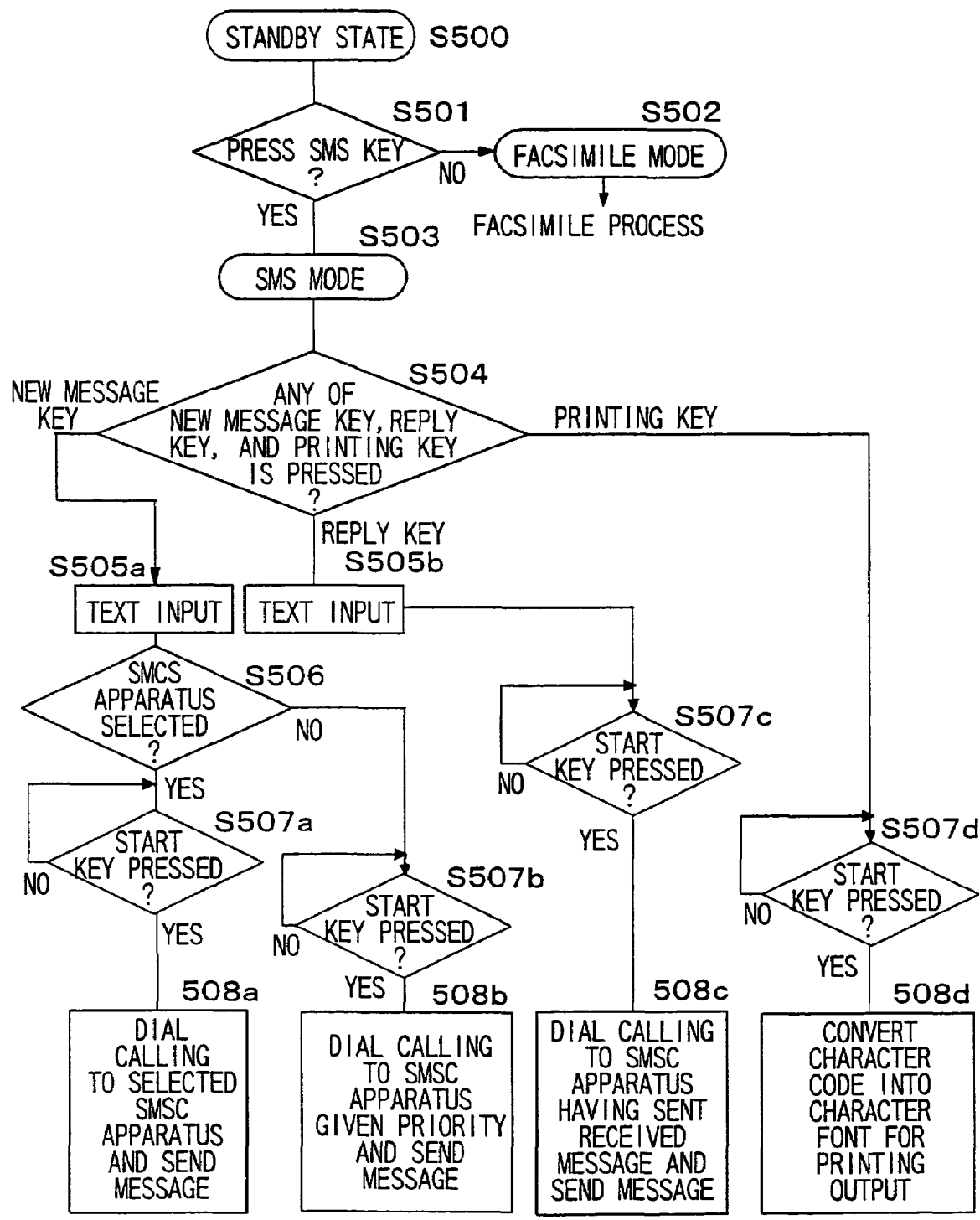
FIG. 5 is a flow chart showing the short message data sending process of the SMTE.

FIG. 5 is a flow chart showing the short message data sending process of the SMTE 1. First, in a step S500, the SMTE 1 is in a standby state. In a step S501, the control device 19 determines whether or not the SMS mode key 132a is pressed, and when a key other than the SMS mode key 132a is operated, the procedure goes to a step S502. When the SMS mode key 132a is pressed, the procedure goes to a step S503.

In the step S502, the SMTE 1 is turned to be in the facsimile mode and performs a facsimile process. In the step S503, the SMTE 1 is turned to be in the SMS mode. In a step S504, the control device 19 determines which key of the new message key 132b, the reply key 132c and the printing key 132e is pressed. When the new message key 132b is pressed, the procedure goes to a step S505a. When the reply key 132c is pressed, the procedure goes to a step S505b. When the printing key 132e is pressed, the procedure goes to a step S507d. In the steps S505a and S505b, short message data is inputted by the user operating the input device 13. When sending a reply to a short message, the reply key 132c can be pressed while the short message is displayed, as described above.

In the step S506, the control device 19 determines whether or not the SMSC apparatus to which a message is to be sent is selected. The SMSC apparatus can be selected by having the name of each SMSC apparatus stored in the SMS related table memory portion 142 displayed on the display device 18 so that the user selects the name of the SMSC apparatus with the input device 13. Thus, a desired SMSC apparatus of a plurality of SMSC apparatuses can be selected and a short message can be sent thereto. When the SMSC apparatus to which the short message is to be sent is selected, the procedure goes to a step S507a, and when the SMSC apparatus to which the short message is to be sent is not selected, the procedure goes to a step S507b. Here, it is assumed that the SMSC apparatus 100 is selected.

In the steps S507a, S507b, S507c and S507d, the control device 19 determines whether or not the start key 132f is pressed. If the start key 132f is pressed, the procedure goes to steps S508a, S508b, S508c or S508d, and if the start key 132f is not-pressed, a start operation is waited for.

In the step S508a, the storage region 101 for the SMSC apparatus of the selected SMSC apparatus 100 is referred to, and a dial calling is performed to the stored telephone number "987 654 321". After the line is established, short message data is sent. The processes up to this stage are the same processes as sending the short message A shown in FIG. 1.

In the step S508b, no SMSC apparatus is selected, the priority sending flags of the storage regions for all the SMSC apparatuses are referred to, and a dial calling is performed to the telephone number of the SMSC apparatus 300 whose priority sending flag is set to "1". After the line is established, short message data is sent out. The processes up to this stage are the same processes as sending the short message B shown in FIG. 1.

In the step S508c, a dial calling is performed to the telephone number of the SMSC apparatus that sent the received short message. After the line is established, short message data is sent out. The telephone number of the SMSC apparatus that sent the received short message is the telephone number stored in the storage region for the SMSC apparatus in which the selected short message data is stored.

In the step S508d, the character code of the received short message data is developed to the character font adapted to the printing device 17 included in the SMTE for printing.

FIG. 6 is a flow chart showing the short message data receiving process of the SMTE 1. First, in a step S600, the SMTE 1 is in a standby state. In a step S601, when an incoming calling signal (ringer) has arrived from the switchboard of the PSTN 400, the network control device 10 detects the incoming calling signal. In a step S602, the telephone number contained in the received incoming calling signal is compared with the telephone number stored in the storage regions for all the SMSC apparatuses in order to determine whether or not the received incoming calling signal is an incoming calling signal from a registered SMSC apparatus. In a step S603, it is determined whether or not there is a telephone number that matches the telephone number contained in the received incoming calling. When there is a matched telephone number, the procedure goes to a step S604, and when there is no matched telephone number, the procedure goes to a step S610. In the step S610, the processes other than the process of receiving a short message is performed.

In the step S604, the storage region for the SMSC apparatus corresponding to the matched telephone number is referred to, and it is determined whether or not the vacant capacity of the received data storage region is a predetermined capacity or more. When it is the predetermined capacity or more, the procedure goes to a step S607b. When it is smaller than the predetermined capacity, the procedure goes to a step S605. In the step S605, it is determined whether or not the priority receiving flag of the SMSC apparatus corresponding to the matched telephone number is set to "1". When the priority receiving flag is set to "1", the procedure goes to a step S606. When the priority receiving flag is set to "0", the procedure goes to a step S611. In the step S606, the storage region common to the SMSC apparatuses is referred to, and it is determined whether or not the vacant capacity of the common received data storage region is a predetermined capacity or more. When it is the predetermined capacity or more, the procedure goes to a step S607a. When it is smaller than the predetermined capacity, the procedure goes to a step S611.

In the steps S607a and S607b, a line is captured and a communication line with the SMSC apparatus is established. In the steps S608a and S608b, short message data is received. In the step S609a, received short message data is stored in the common received data storage region. In the step S609b, the received short message data is stored in the received data storage region.

In the step S611, no line is captured and a non-response state is maintained. Thus, the switchboard determines the timeout and issues a negative deliver report and the line is opened.

In the course of a process other than the process of sending and receiving short message data, such as the printing process of the printing device 17, the process of inputting short message data to be sent or other processes in which communications are not caused, when an incoming calling is received from an SMSC apparatus, then the control device 19 interrupts the ongoing process and receives short message data. When the short message data is completed to be received, the interrupted process is resumed. Thus, short message data can be received even if another process is being performed, and it is not necessary to call back the SMSC apparatus.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication terminal connected to a public line network, for communicating with a center apparatus connected to the public line network to send and receive short message data to/from another communication terminal via the center apparatus, comprising:

input means for inputting short message data, communicating means that is connected to the public line network, for communicating with the center apparatus, storing means for storing information identifying a plurality of center apparatuses and types of communication protocol information for each of the plurality of center apparatus to be used for communications of the communicating means, selecting means for selecting a center apparatus to be communicated with among the center apparatuses whose communication protocol information is stored, based on a predetermined condition, and controlling means for controlling the communicating means so as to send short message data to the center apparatus when sending the inputted short message data, and to receive short message data from the center apparatus when receiving the short message data, based on the communication protocol information of the center apparatus selected by the selecting means, wherein the storing means includes an individual storing region assigned to each of the plurality of center apparatuses and a common storing region assigned commonly to the plurality of center apparatuses, in which individual storing region, at least identification information to identify the center apparatus, communication protocol information to be used for communications with the center apparatus, and short message data received from the center apparatus are stored, and the controlling means refers to the individual storing region assigned to the center apparatus selected by the selecting means, and controls the communicating means based on the identification information and the communication protocol information that are stored.

2. The communication terminal of claim 1, further comprising:

instructing means for instructing a center apparatus to be communicated with, wherein the selecting means selects the center apparatus based on instruction of the instructing means.

3. The communication terminal of claim 1, wherein the communicating means detects identification information contained in a received incoming calling, the selecting means compares the identification information detected by the communicating means with the identification information of the center apparatus stored in each individual storing region so as to select a center apparatus corresponding to the matched identification information, and the controlling means refers to the individual storing region assigned to the selected center apparatus and controls the communicating means so as to receive short message data based on the stored communication protocol information.

4. The communication terminal of claim 1, wherein a priority receiving flag indicating whether or not the center apparatus is a center apparatus whose short message data should be received by priority is stored in each individual storing region, the controlling means determines whether or not a vacant capacity of the individual storing region assigned to the center apparatus from which short message data is sent is smaller than a predetermined capacity when receiving the short message data; when the vacant capacity is the predetermined capacity or more, the short message data is stored in the individual storing region; and when the vacant capacity is smaller than the predetermined capacity, the priority receiving flag is referred to; and if the center apparatus from which the short message data is sent is a center apparatus whose short message data should be received by priority, the received short message data is stored in the common storing region.

5. The communication terminal of claim 1, further comprising:
designating means for designating specific short message data among the received short message data that is stored in the storing means,
wherein the selecting means selects a center apparatus from which the short message data designated by the designating means are sent, and
the controlling means refers to the individual storing region assigned to the selected center apparatus, and controls the communicating means so as to send the short message data inputted with the input means based on the stored communication protocol information.

6. The communication terminal of claim 1, further comprising:
at least one of displaying means for displaying received short message data, and printing means for printing received short message data.

7. The communication terminal of claim 1, wherein the communication terminal transmits the short message data over a Public Switchboard Telephone Network.

8. The communication terminal of claim 1, wherein the communication terminal transmits the short message data over a switched circuit network.

9. The communication terminal of claim 1, wherein the short message data is created at the communication terminal.

10. The communication terminal of claim 1,
wherein the communication terminal is a point of origin of the short message data.

11. A communication terminal connected to a public line network, for communicating with a center apparatus connected to the public line network to send and receive short message data to/from another communication terminal via the center apparatus, comprising:
input means for inputting short message data,
communicating means that is connected to the public line network, for communicating with the center apparatus,
storing means for storing information identifying a plurality of center apparatuses and types of communication protocol information for each of the plurality of center apparatus to be used for communications of the communicating means,
selecting means for selecting a center apparatus to be communicated with among the center apparatuses whose communication protocol information is stored, based on a predetermined condition, and
controlling means for controlling the communicating means so as to send short message data to the center apparatus when sending the inputted short message data, and to receive short message data from the center apparatus when receiving the short message data, based on the communication protocol information of the center apparatus selected by the selecting means,
wherein when an incoming calling signal is received from a center apparatus by the communicating means in the course of performing a process other than the process of sending and receiving short message data,
the controlling means interrupts the ongoing process, and controls the communicating means so as to receive short message data, and the controlling means resumes the interrupted process when the short message data is completed to be received.

\* \* \* \* \*